(12) United States Patent
Stempel et al.

(10) Patent No.: US 7,478,228 B2
(45) Date of Patent: Jan. 13, 2009

(54) APPARATUS FOR GENERATING RETURN ADDRESS PREDICTIONS FOR IMPLICIT AND EXPLICIT SUBROUTINE CALLS

(75) Inventors: Brian Michael Stempel, Raleigh, NC (US); James Norris Dieffenderfer, Apex, NC (US); Thomas Andrew Sartorius, Raleigh, NC (US); Rodney Wayne Smith, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 11/468,835

(22) Filed: Aug. 31, 2006

(65) Prior Publication Data
US 2008/0059780 A1    Mar. 6, 2008

(51) Int. Cl.
*G06F 9/32* (2006.01)
(52) U.S. Cl. ...................................... 712/242
(58) Field of Classification Search ................. 712/233, 712/239, 242, 243, 213
See application file for complete search history.

(56) References Cited

U.S. PATENT DOCUMENTS

| | | | | |
|---|---|---|---|---|
| 4,604,695 A | * | 8/1986 | Widen et al. ................. 711/217 |
| 5,729,727 A | * | 3/1998 | Suzuki ........................ 712/233 |
| 5,964,869 A | * | 10/1999 | Talcott et al. ................ 712/236 |
| 6,157,999 A | | 12/2000 | Rossbach |
| 6,889,320 B1 | * | 5/2005 | Davis et al. .................. 712/233 |
| 2005/0055541 A1 | * | 3/2005 | Aamodt et al. ............... 712/217 |
| 2005/0154859 A1 | | 7/2005 | Gilkerson |

FOREIGN PATENT DOCUMENTS

WO      0004444      1/2000

* cited by examiner

*Primary Examiner*—David J Huisman
(74) *Attorney, Agent, or Firm*—Nicholas J. Pauley; Joseph B. Agusta; Thomas Rouse (57) ABSTRACT

An apparatus for emulating the branch prediction behavior of an explicit subroutine call is disclosed. The apparatus includes a first input which is configured to receive an instruction address and a second input. The second input is configured to receive predecode information which describes the instruction address as being related to an implicit subroutine call to a subroutine. In response to the predecode information, the apparatus also includes an adder configured to add a constant to the instruction address defining a return address, causing the return address to be stored to an explicit subroutine resource, thus, facilitating subsequent branch prediction of a return call instruction.

13 Claims, 5 Drawing Sheets

APPARATUS FOR GENERATING RETURN ADDRESS PREDICTIONS FOR IMPLICIT AND EXPLICIT SUBROUTINE CALLS

FIELD OF THE INVENTION

The present invention relates generally to the field of pipelined processors and in particular to a method of emulating the branch prediction behavior of an explicit subroutine call on an implicit subroutine call in order to reduce power and increase utilization of the pipelined processor.

BACKGROUND

Microprocessors perform computational tasks in a wide variety of applications. Improved processor performance is almost always desirable, to allow for faster operation and/or increased functionality through software changes. In many embedded applications, such as portable electronic devices, conserving power is also an important goal in processor design and implementation.

Many modern processors employ a pipelined architecture, where sequential instructions are overlapped in execution to increase overall processor throughput. Maintaining smooth execution through the pipeline is critical to achieving high performance. Most modern processors also utilize a hierarchical memory, with fast, on-chip cache memories storing local copies of recently accessed data and instructions.

Real-world programs include indirect branch instructions, the actual branching behavior of which is not known until the instruction is actually evaluated deep in the execution pipeline. Most modern processors employ some form of branch prediction, whereby the branching behavior of indirect branch instructions is predicted early in the pipeline, such as during a fetch or decode pipe stage. Utilizing a branch prediction technique, the processor speculatively fetches the target of the indirect branch instruction and redirects the pipeline to begin processing the speculatively fetched instructions. When the actual branch target is determined in a later pipe stage such as an execution pipe stage, if the branch was mispredicted, the speculatively fetched instructions must be flushed from the pipeline, and new instructions fetched from the correct target address. Prefetching instructions in response to an erroneous branch target prediction adversely impacts processor performance and power consumption.

One example of indirect branch instructions includes branch instructions utilized to return from a subroutine. For example, a return call from a subroutine may include a branch instruction whose return address is defined by the contents of a register. A return address defines the next instruction to be fetched after the subroutine completes and is commonly the instruction after a branch instruction from which the subroutine was originally called. Many high-performance architectures designate a particular general purpose register for use in subroutine returns, commonly referred to as a link register.

For convenience, a return call may also be referred to as a branch return instruction. In order for a processor pipeline to utilize branch prediction for a branch return instruction, conventional software includes an explicit subroutine call such as a branch and link instruction to record the return address into the link register. Many high performance implementations include a link stack structure at the decode stage of processing the branch and link instruction. Link return values are pushed onto this stack, in order to allow for accurate branch prediction when the corresponding subroutines return. Conventional link stack structures contain a list of return addresses in order to support multiple subroutine calls flowing through a pipeline and to support the nesting of multiple levels of subroutine calls. Subsequently, when the branch return instruction within the subroutine is being decoded, the return address is read from the link stack structure to be utilized in branch prediction to predict the target address if other branch prediction hardware dictates that the processor should redirect the pipeline. If the prediction indicates to redirect the pipeline, the pipeline begins fetching instructions from the return address that was read from the link stack.

However, there exists legacy software which does not incorporate conventional branch and link instructions when calling a subroutine and therefore which is unable to utilize the link stack structure. By way of example, refer to the following table containing a code segment which would run on an ARM Ltd. compatible processor:

TABLE 1

| Legacy Code Segment. | |
| --- | --- |
| 0x00899900 | MOV LR, PC |
| 0x00899904 | BR 0x00990000 |
| 0x00899908 | $INSTR_A$ |
| 0x00899912 | $INSTR_B$ |
| . . . | |
| 0x00990000 | LDA |
| 0x00990004 | ADD |
| 0x00990008 | BX LR |

The combination of the MOV LR, PC and BR instructions prepare the processor for a subsequent branch to a subroutine. In this example, the actual subroutine to which the call is made begins at address 0x00990000. The MOV LR, PC instruction indicates that the contents of the program counter (PC) should be copied into a link register (LR). In some instruction architectures such as ARM, the program counter is actually defined as the current instruction address plus 8 bytes. With this definition, moving the contents of the PC to LR results in storing the return address, address 0x00899908, into the link register. The return address is retrieved from the link register at the end of the subroutine. More specifically, the return address is retrieved when executing BX LR, the branch return instruction.

In modern processors which include deep pipelines and utilize branch prediction techniques, predicting the return address when decoding the branch return instruction without using a link stack is problematic for various reasons. One reason involves a microarchitectural convention which does not allow a general purpose register such as a link register to be accessed during a decode stage of a pipeline, thus precluding branch prediction of the return address using a "current" value of the link register at branch prediction time. Even if a variance can be made to this microarchitectural convention, today's deep pipelines may cause the data contained in a link register to be unreliable for prediction purposes. For example, in the time it takes a branch instruction to flow from a decode pipe stage where a prediction is made for the return address to an execute pipe stage where an actual resolution of the return address is made, a subsequent branch instruction may enter the pipeline and overwrite the link register, causing the actual resolution of the return address for the initial branch return instruction to be different than the predicted return address. This mismatch between the predicted value and the actual resolution is referred to as a branch target mispredict. Branch mispredicts result in lost time and lost power, both of which are the result of speculatively executing down an incorrectly predicted path.

Given the pervasiveness of such legacy software and the cost involved in re-writing legacy software to utilize conventional branch and link instructions when calling a subroutine, there exists a need for microprocessors developed today to support legacy software and have that legacy software utilize a link stack structure in order to effectively predict the return address when a branch return instruction is in a decode pipe stage.

SUMMARY

The present disclosure recognizes a pattern of instructions which define an implicit subroutine call to a subroutine and utilizes this recognition to devise methods and apparatus for utilizing explicit subroutine call resources to allow branch prediction to predict the return address of the subroutine.

According to one aspect, a method of emulating branch prediction behavior of an explicit subroutine is disclosed. The method includes recognizing an instruction address indicating an implicit subroutine call to a subroutine, calculating a return address from the instruction address, and storing the return address to an explicit subroutine resource.

Another aspect relates to an apparatus. The apparatus includes a first input which is configured to receive an instruction address and a second input. The second input is configured to receive predecode information which describes the instruction address as being associated to an implicit subroutine call to a subroutine. In response to the predecode information, the apparatus also includes an adder configured to add an offset to the instruction address defining a return address. The adder is also configured to store the return address to an explicit subroutine resource facilitating subsequent branch prediction of a return call instruction.

According to yet another aspect, another apparatus is disclosed. The apparatus comprises first and second inputs configured to concurrently receive first and second instruction addresses and associated predecode information. The apparatus further comprises a first set of adders configured to add an offset to the first and second instruction addresses to define first and second results in response to the predecode information indicating the first or second instruction address is associated to an implicit subroutine call to a subroutine. The apparatus further comprises a means for selecting a return address from one of the first or second results.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the present invention. Accordingly, the drawings and detailed description are to be regarded as illustrative in nature and not as restrictive.

DETAILED DESCRIPTION

Figure 1:
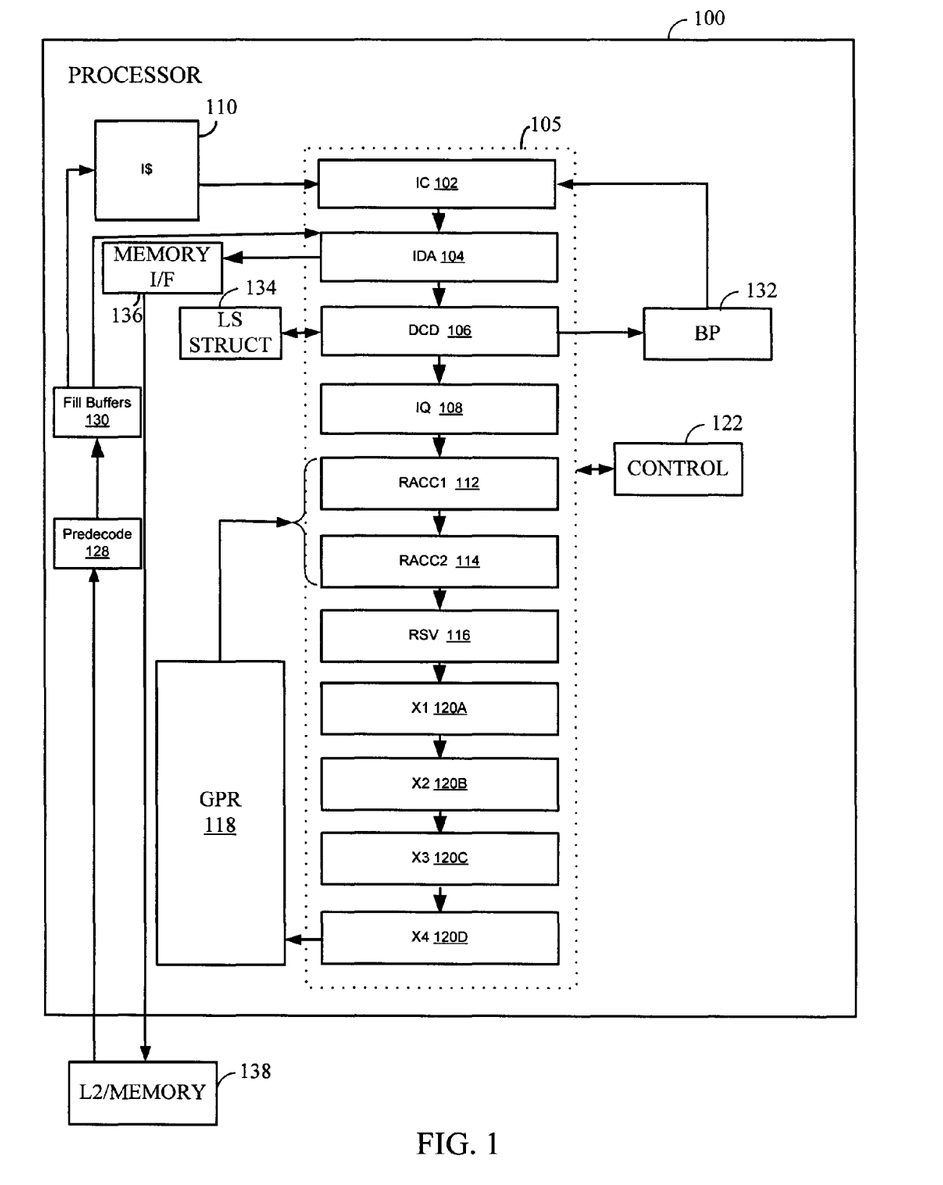
FIG. 1 is a functional block diagram of a processor.

FIG. 1 depicts a functional block diagram of a processor 100 in which aspects of the present invention may be employed. The processor 100 includes an instruction cache (I-cache) 110 for caching recently processed instructions, a memory interface 136 for accessing memory 138 when an instruction is not found in I-cache 110, a predecode logic circuit 128 for performing limited decode of an instruction retrieved from memory 138, and a fill buffer logic circuit 130 for writing instruction data including predecode bits into I-cache 110 in response to a miss in the I-cache 110. Predecode bits are associated with the instruction retrieved from memory and contain attributes describing the instruction such as an indication of the instruction type. Memory 138 may be located on or off the processor 100 and may comprise a layer 2 (L2) memory component.

The processor 100 also includes an instruction pipeline 105 for processing instructions and a branch prediction circuit 132 for predicting a target address for an indirect branch instruction and predicting whether to redirect instruction pipeline 105 to process the target address. If the branch prediction circuit 132 predicts to redirect the instruction pipeline 105, the indirect branch instruction is said to have been "predicted taken." If the indirect branch instruction has been "predicted taken," the branch prediction circuit 132 predicts a target address of the indirect branch instruction and redirects the instruction pipeline 105 to begin fetching instructions beginning at the target address.

The processor 100 processes instructions in an instruction pipeline 105 according to control logic circuit 122. In some embodiments, the pipeline 105 may be a superscalar design having two or more parallel pipelines. The pipeline 105 includes various pipe stages: an instruction cache lookup (IC) stage 102, an instruction data alignment (IDA) stage 104, a decode (DCD) stage 106, an instruction queue (IQ) stage 108, a first register access (RACC1) stage 112, a second register access (RACC2) stage 114, a reservation station (RSV) stage 116, and four execution stages (X1-X4) 120A-120D. In some embodiments, a pipe stage may process a single instruction at a time. In another embodiment, a pipe stage may concurrently process two or more instructions. It should be noted that pipe stages may be added to or subtracted from pipeline 105 without limiting the scope of the present disclosure. The processor 100 also includes a General Purpose Register (GPR) file 118 which includes registers that, through microarchitectural convention, are accessible by pipe stages 112, 114, and 120A-120D.

The Instruction cache lookup (IC) stage 102 attempts to retrieve an instruction from in I-cache 110. The instruction data alignment stage 104 parses out multiple instructions and predecode information associated with multiple instructions. If an instruction address is not found in I-cache 110, the instruction data alignment stage 104 initiates a request to retrieve the corresponding instruction from memory 138. The decode stage 106 fully decodes an instruction. Furthermore, in addition to conventional functions, decode stage 106 recognizes explicit subroutine call instructions and writes a return address into a link stack structure 134. Moreover, decode stage 106 also recognizes an implicit subroutine call from legacy software and stores a return address into a link stack structure 134. The link stack structure 134 may be a set of registers managed as a circular buffer. The return address is an address of an instruction to which pipeline 105 is to be redirected at the completion of the implicit subroutine. The structure and operation of the pertinent aspects of the decode stage 106 will be described more fully in connection with the discussion of FIGS. 3-5.

The instruction queue stage 108 buffers one or more instructions in order to allow speculative fetching to continue during stalls of the execution pipeline. The first and second register access stages 112 and 114 retrieve one or more operands from the general purpose register 118 as may be needed by an instruction. The reservation stations stage 116 allows an instruction to wait for read-after-write hazards and the like to be resolved. Execute stages include known components such as arithmetic logic units and the like. Execute stages 120A-120D execute instructions. The results produced from the execute stages are written to the GPR file 118. During execute stages 120A-120D, actual branch resolution takes place to determine if branch prediction made during decode stage 106 is correct. If the actual branch resolution differs from the predicted destination, a branch is said to have been mispredicted.

Those of skill in the art will recognize that numerous variations of the processor 100 are possible. For example, the processor 100 may include a second-level (L2) cache for I-cache 110. In addition, one or more of the functional blocks depicted in the processor 100 may be omitted from a particular embodiment. Other functional blocks that may reside in the processor 100, such as a translation lookaside buffer, data cache, and the like are not germane to a description of the present invention, and are omitted for clarity.

Figure 2:
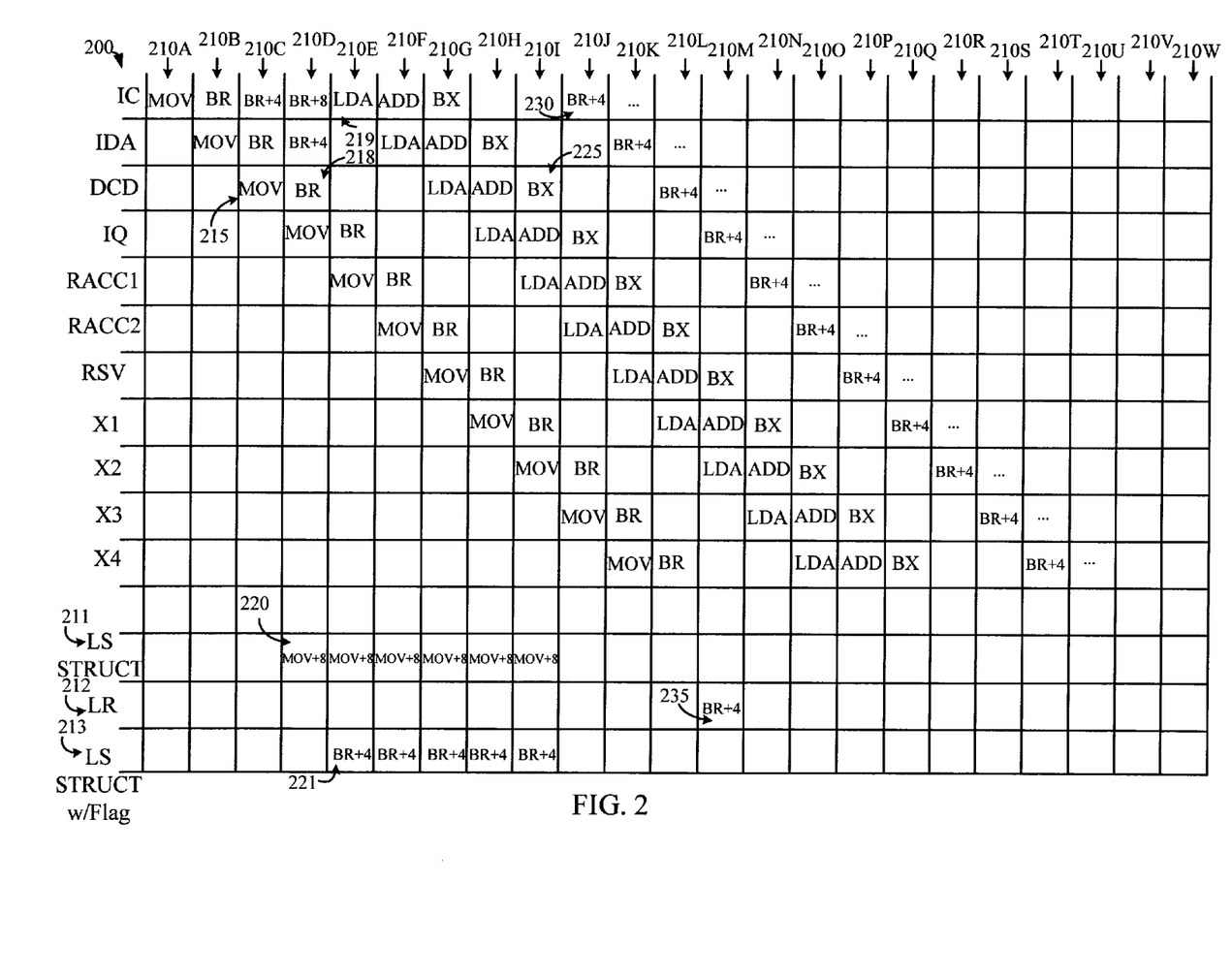
FIG. 2 is a timing diagram which follows a flow of instructions through the pipeline illustrated in FIG. 1.

FIG. 2 is a timing diagram 200 which follows a flow of instructions through the pipeline 105 illustrated in FIG. 1. In particular, the flow of instructions traced in timing diagram 200 is the legacy code segment as illustrated in Table 1. For the purposes of the present disclosure, the term "implicit subroutine call" refers to a combination of two or more instructions whose combined function is to set registers preparing for a subroutine call and to call a subroutine. For example, referring to Table 1, the two instructions in the MOV LR, PC/BR combination define an implicit subroutine call. In this case, the MOV LR, PC instruction defines the beginning of the implicit subroutine call and the BR instruction defines the end of the implicit subroutine call.

The first eleven rows of timing diagram 200 correspond to the stages of pipeline 105. Columns 210A-210W correspond to sequential timing cycles. For explanation purposes, each pipe stage processes one instruction per cycle. However, it should be recognized by one skilled in the art that the teachings of the present disclosure apply to both multiple cycle pipe stages and to pipe stages that are able to process multiple instructions per cycle.

Figure 3:
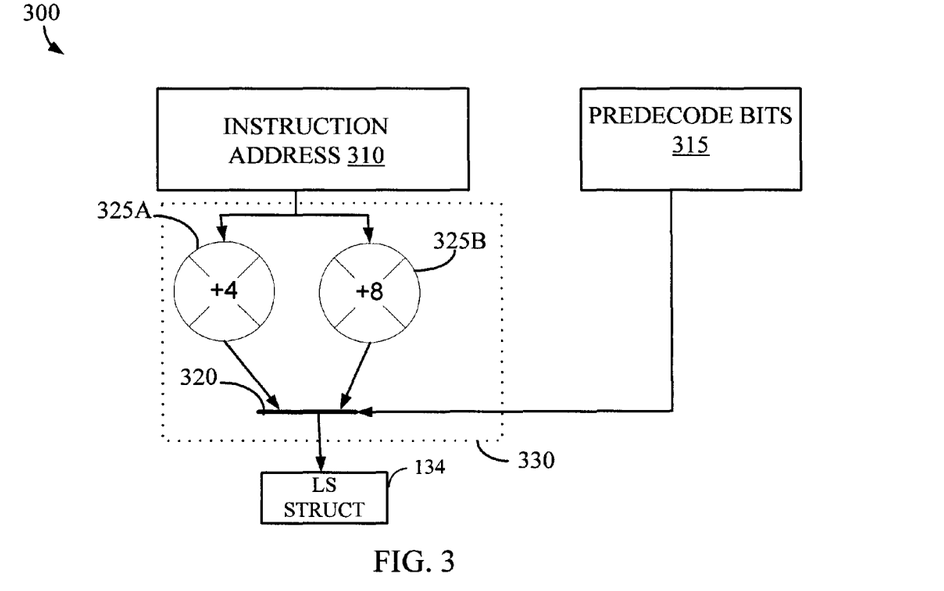
FIG. 3 is an exemplary portion of a single instruction decode pipe stage.
Figure 4:
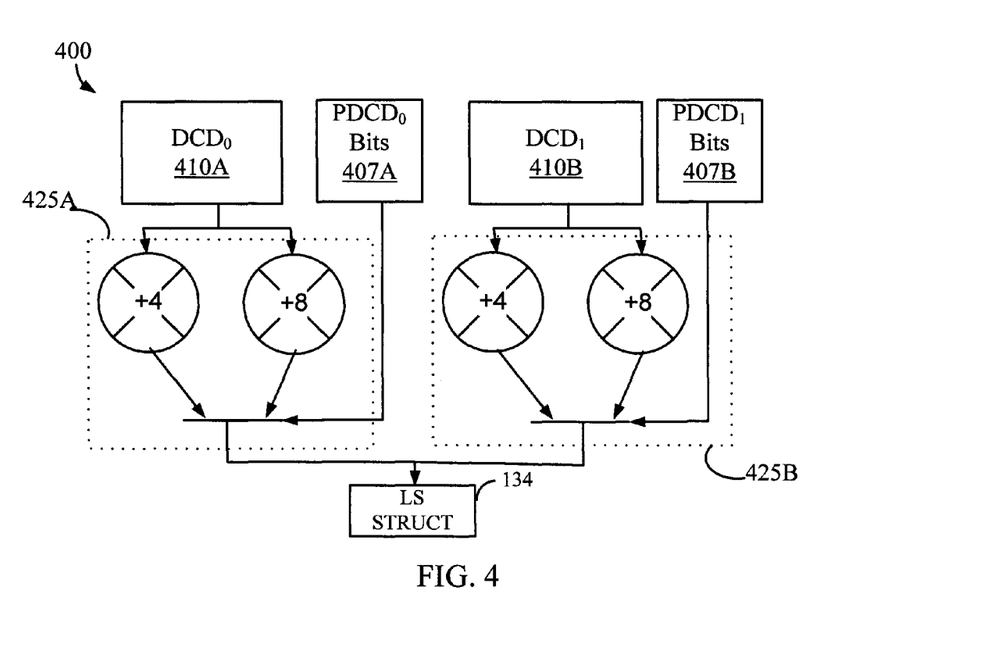
FIG. 4 is an exemplary first aspect of a portion of a two instruction decode pipe stage.

Row 211 of timing diagram 200 corresponds to the contents of a link stack structure such as link stack structure 134 as a result of the aspects of the decode pipe stage illustrated in FIGS. 3 and 4. Row 213 of timing diagram 200 corresponds to the contents of the link stack structure as a result of the aspects of the decode pipe stage illustrated in FIG. 5. Row 213 will be discussed in connection with the discussion of FIG. 5. Row 212 of the timing diagram 200 corresponds to the contents of a link register.

In general, instructions enter the IC stage 102 and propagate to the next stage in the next cycle. At 215, the MOV LR, PC instruction is in the decode stage 106. At that point in time, decode stage 106 recognizes the MOV LR, PC and stores the return address, MOV+8, into the link stack structure. For nomenclature purposes, MOV+8 refers to adding an offset of eight to the address of the MOV instruction. The value eight includes the four bytes of the MOV instruction and the four bytes of the subsequent BR instruction so that the link stack structure contains the address of the sequential instruction after the BR instruction. As will be discussed further in connection with the discussion of FIGS. 3-4, a decode stage according to the present teachings of the disclosure adds the offset of eight to the address of the MOV instruction. As will be discussed further in connection with the discussion of FIG. 5, an alternative decode stage according to the present teachings of the disclosure adds an offset of four to the address of the BR instruction. It should be noted that both notations MOV+8 and BR+4 refer to address 0x00899908, the return address. At reference 220, the link stack structure shows its contents to be MOV+8. When the BR instruction is processed at reference 218 by the decode stage 106, the target of the branch instruction, the beginning of the subroutine, is predicted and fetched by the pipeline in the next cycle. At reference 219, the LDA instruction, the beginning of the subroutine, is processed by the IC stage 102. Since the pipeline 105 has been redirected to fetch the LDA instruction due to the prediction of the branch instruction, instructions at addresses BR+4 and BR+8 are flushed from the pipeline. The instructions sequentially following the LDA instruction are then fetched into pipeline 105.

At reference 225, the branch return instruction, BX, is processed by decode stage 106. Decode stage 106 invokes branch prediction circuit 132 with the contents of the link stack structure to predict the return address. In another embodiment, the branch prediction circuit 132 reads the link stack structure. In either case, the branch prediction circuit 132 utilizes the link stack structure to predict the return address and, at reference 230, the pipeline is redirected to fetch the instruction at return address 0x00899908. Once utilized, the MOV+8 entry at row 211 column 210J is removed from the link stack structure.

In conventional processors which do not make use of a link stack for implicit subroutine calls, the value of the link register (LR) itself may not have been updated in time to be used in cycle 210I, when the subroutine return instruction is in the DCD stage and attempting to predict. As shown in the diagram, the LR is not updated until cycle 210M, which is four cycles later than would have been required to use this value in the DCD stage. The cycle 210M at reference 235 is after the cycle 210I where the prediction and fetch of the branch return address is made. Thus, in conventional processors, branch prediction on the branch return instruction stored in a link register may be unreliable.

Figure 5:
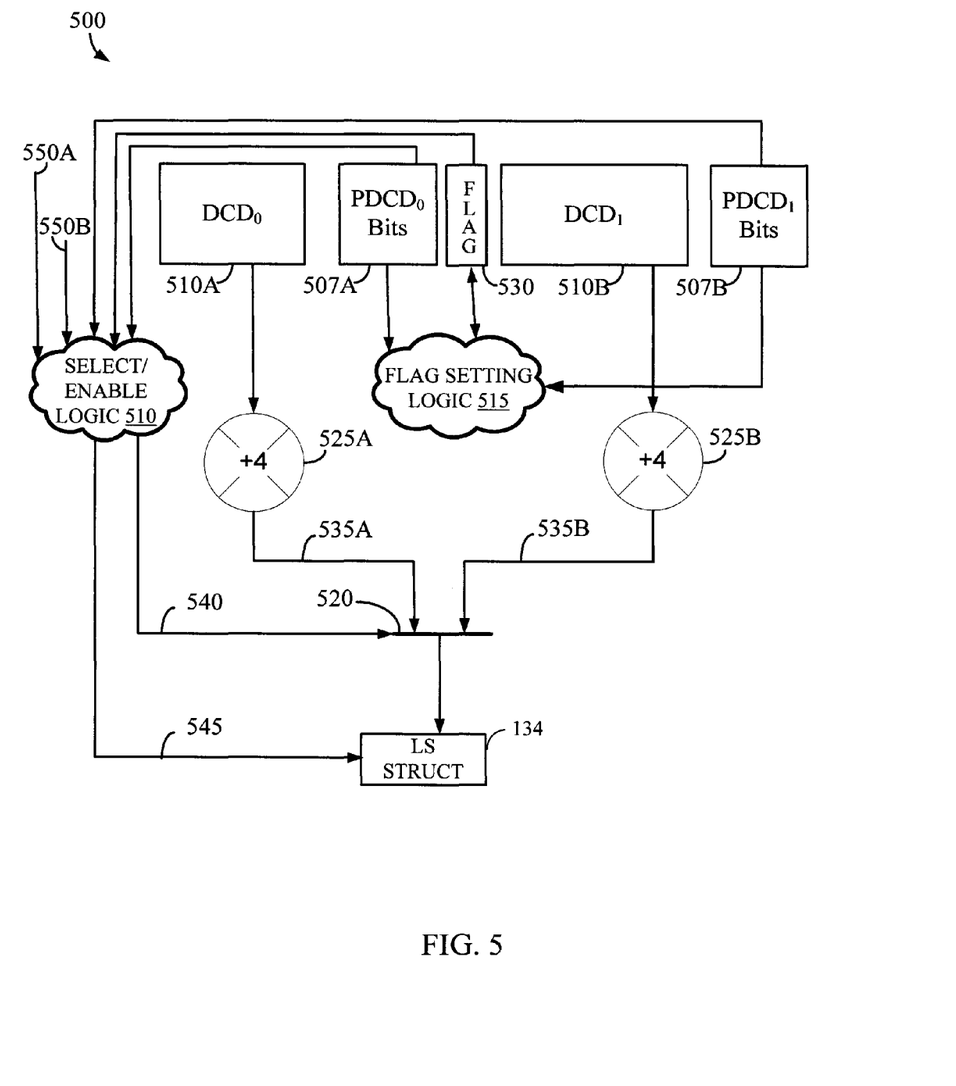
FIG. 5 is an exemplary second aspect of a portion of a two instruction decode pipe stage of FIG. 1.

FIGS. 3-5 illustrate alternative aspects of the invention related to a decode pipe stage such as decode pipe stage 106. These alternative aspects address paths for writing to a link status structure for both an implicit subroutine call and a conventional branch and link instruction. It should be noted that other paths are included in the decode pipe stage, for example, paths of other instructions in the instruction set, but have no bearing on this aspect of the present invention and are thus not depicted in the drawings.

FIG. 3 is an exemplary portion 300 of a single instruction decode pipe stage. The portion 300 of the single instruction decode pipe stage may suitably be disposed in decode stage 106. The portion 300 of the single instruction decode pipe stage includes an instruction address 310 and predecode bits 315 associated with the instruction address 310. The size of the instruction address 310 is 32 bits long and the size of the predecode bits 315 is 8 bits long. It should be noted that aspects of the present disclosure contemplates various sizes of the instruction address or predecode bits and their respective bit positions. The instruction address 310 and the predecode bits 315 are input to the portion 300 of the decode pipe stage and may reside in the same or different data registers.

The predecode bits 315 include information relating to the instruction corresponding to the instruction address 310 and are determined by the predecode logic circuit 128. The predecode bits 315 indicate whether the corresponding instruction is the beginning of an implicit subroutine call such as the MOV LR, PC instruction in the MOV/BR combination listed in Table 1. The predecode bits 315 may be encoded in various manners including encoding a particular bit or a combination of the predecode bits 315 to indicate that the instruction address 310 refers to either the beginning of the implicit subroutine call or a conventional branch and link instruction. In another embodiment, the operation code (opcode) of the instruction may be utilized to distinguish the implicit subroutine call and the conventional branch and link instruction from other instructions in the instruction set.

The portion 300 of the decode pipe stage further includes an adder/multiplexer combination 330. The adder/multiplexer combination 330 includes adders 325A-325B, multiplexer 320 and a link stack structure 134. The adder 325A adds the constant four to the instruction address in the case the instruction address 310 refers to a conventional branch and link instruction. The adder 325B adds the constant eight to the instruction address in the case the instruction address 310 refers to the beginning of an implicit subroutine call. Through multiplexer 320, the predecode bits 315 select which incremented address or return address is written to the link stack structure 134, if any. Referring to Table 1, the offset of eight is illustrated to reflect that the location of the return address is eight bytes after the MOV instruction. In a conventional branch and link instruction, the return address is four bytes after the branch and link instruction. Although not shown, other adders may be added or may replace illustrated adders in FIGS. 3-5 depending on the number of instructions composing an implicit subroutine call and the size of each of the instructions composing the implicit subroutine call.

FIG. 4 is an exemplary first aspect of a portion 400 of a two instruction decode pipe stage. The portion 400 of the two instruction decode pipe stage may suitably be disposed in decode stage 106. The portion 400 of the two instruction decode pipe stage includes two instruction addresses 410A-410B received concurrently with their respective predecode bits 407A-B and two sets of adder/multiplexer combinations 425A-425B. The instruction addresses 410A-410B and the predecode bits 407A-B are input to the portion 400 of the decode pipe stage and may reside in the same or different data registers.

The beginning of the implicit subroutine call such as the address for the MOV LR, PC instruction may be found in either instruction address 410A or 410B. By convention, instruction address 410A or $DCD_0$ is first in program order and instruction address 410B or $DCD_1$ is second in program order. When the address for the instruction defining the beginning of the implicit subroutine such as the address for the MOV LR, PC instruction is located in instruction address 410A, the output of the adder/multiplexer 425A is valid and this incremented address is written to the link stack structure 134. If the address for the beginning of the implicit subroutine is instruction address 410B, the output of the adder/multiplexer 425B is valid and this incremented address or return address is written to the link stack structure 134. When an implicit subroutine is recognized, the aspects of the decode pipe stage illustrated in FIGS. 3 and 4 write to the link stack structure 134 at the beginning instruction defining the implicit subroutine.

FIG. 5 is an exemplary second aspect of a portion 500 of a two instruction decode pipe stage. The portion 500 of the two instruction decode pipe stage may suitably be disposed in decode stage 106. The portion 500 of the two instruction decode pipe stage writes the return address to the link stack structure 134 in response to receiving the last instruction address defining the implicit subroutine call. Referring back to FIG. 2, for example, the link status structure 213 is written to at reference 221 by the portion 500 of the two instructions decode pipe stage, one cycle after decoding the branch instruction of the MOV/BR combination. Consequently, as illustrated, the value of BR+4 is written to the link status structure 213 at reference 221.

The portion 500 of the two instruction decode pipe stage includes two instruction addresses 510A-510B received concurrently with their respective predecode bits 507A-B. The instruction addresses 510A-510B ($DCD_0$ and $DCD_1$) and their respective predecode bits 507A-B ($PDCD_0$ and $PDCD_1$) are input to the portion 500 of the decode pipe stage and may reside in the same or different data registers.

The portion 500 of the decode pipe stage further includes select/enable logic circuit 510, flag setting logic circuit 515, adders 525A and 525B, and multiplexer 520. The flag setting logic circuit 515 sets and resets a flag 530. The flag 530 tracks whether the start of the implicit subroutine call has been recognized in either address 510A or address 510B. The flag 530 is not utilized if both addresses indicating the start and end of the implicit subroutine call are concurrently received. In the case of the implicit subroutine defined by the MOV LR, PC/BR combination, the flag setting logic circuit 515 utilizing $PDCD_0$ and $PDCD_1$ bits sets the flag 530 when the address of instruction MOV LR, PC resides in the final valid decode slot, which can be either $DCD_0$ (when $DCD_1$ is invalid) or $DCD_1$.

The select/enable logic circuit 510 determines whether $DCD_0$ or $DCD_1$ contains the address of the end of the implicit subroutine call. If the end of the implicit subroutine call is in $DCD_0$, adder 525A adds four to the address in $DCD_0$ in order to calculate the return address for the implicit subroutine call. If the end of the implicit subroutine call is in $DCD_1$, adder 525B adds four to the address in $DCD_1$ in order calculate the return address. The select/enable logic circuit 510 generates a select signal 540 if the end of the implicit subroutine call is present in $DCD_0$ or $DCD_1$ and, if so, selects which incremented instruction address 535A or 535B to be written in the link stack structure 134.

To ensure that the link stack structure 134 is not needlessly written, the select/enable logic circuit 510 receives as input predicted taken signals 550A and 55GB corresponding to instruction addresses $DCD_0$ and $DCD_1$, respectively, from the branch prediction circuit 132. If an implicit subroutine call is recognized in a processor pipeline and the implicit subroutine has been predicted taken by branch prediction circuit 132, the select/enable logic circuit 510 generates a write enable signal 545 to the link stack structure 134 to enable it for being written. If an implicit subroutine call is recognized but is predicted not taken, the select/enable logic circuit 510 does not generate a write enable to the link stack structure 134. In this way, implicit subroutine calls which are predicted not taken do not result in writing to the link stack structure 134. It should be noted that although the present disclosure describes the recognition of an implicit subroutine call and the writing to the link stack structure in the decode stage pipeline, one skilled in the art would recognize that these aspects of the invention may be practiced in any stage of a processor pipeline where predecode bits have been determined and a branch prediction has been made.

Figure 6:
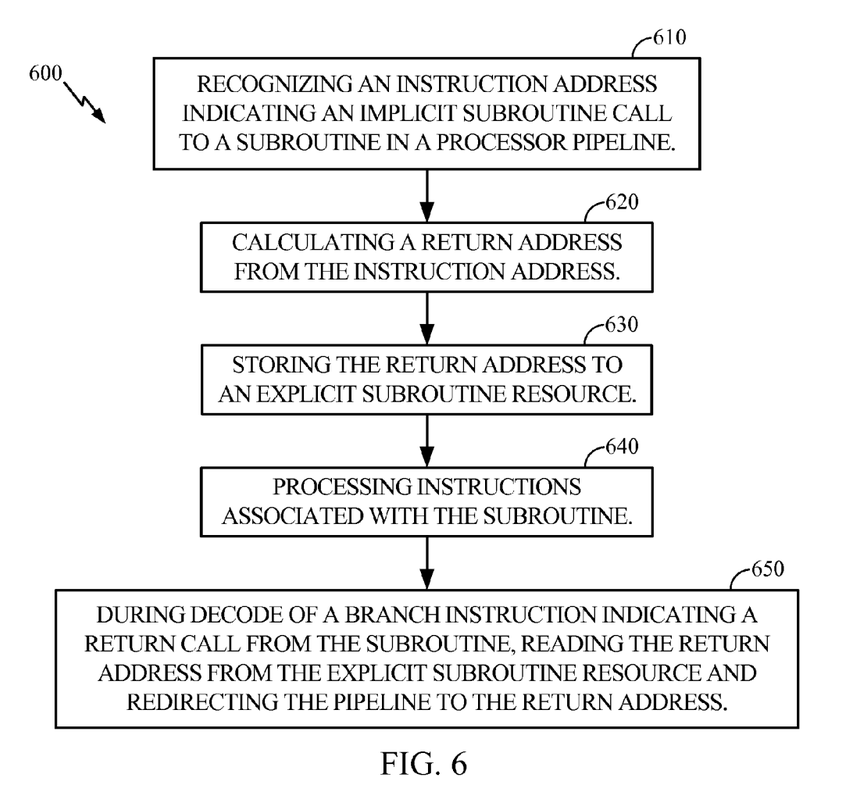
FIG. 6 is a flow chart illustrating a method of emulating the branch prediction behavior of an explicit subroutine when recognizing an implicit subroutine call.

FIG. 6 is a flow chart illustrating a method 600 of emulating the branch prediction behavior of an explicit subroutine when recognizing an implicit subroutine call. At block 610, an instruction address indicating an implicit subroutine call to a subroutine is recognized in a processor pipeline. At block 620, a return address from the instruction address is calculated. If an implicit subroutine call comprises two or more instructions, the offset amount added to the instruction address is dependent on various factors including whether the recognition is made at the beginning or end of the implicit subroutine call and the size of the instructions composing the implicit subroutine call. At block 630, the return address is stored to an explicit subroutine resource such as the link stack structure 134. As described in FIGS. 3-5, blocks 610, 620, and 630 may take place during the decode stage 106.

At block 640, the processor pipeline processes instructions associated with the called subroutine. For example, referring to Table 1, at block 640 instruction addresses 0x00990000-0x00990008 would be processed. At block 650, the return address is read from the explicit subroutine resource in response to a branch instruction indicating a return call from the subroutine such as 0x00990008 BX in Table 1. Additionally at block 650, the processor pipeline is redirected to the return address read from the explicit subroutine resource. While the return call instruction is in the decode stage 106, the return address is retrieved from the link stack structure 134 in the same manner as when a return address is retrieved in response to a return call for a subroutine called by a conventional branch and link instruction. Once the return address is retrieved and the return call instruction is predicted taken, the return address is fetched by the processor pipeline, advantageously allowing an earlier fetch of the return address as illustrated in FIG. 2.

Figure 7:
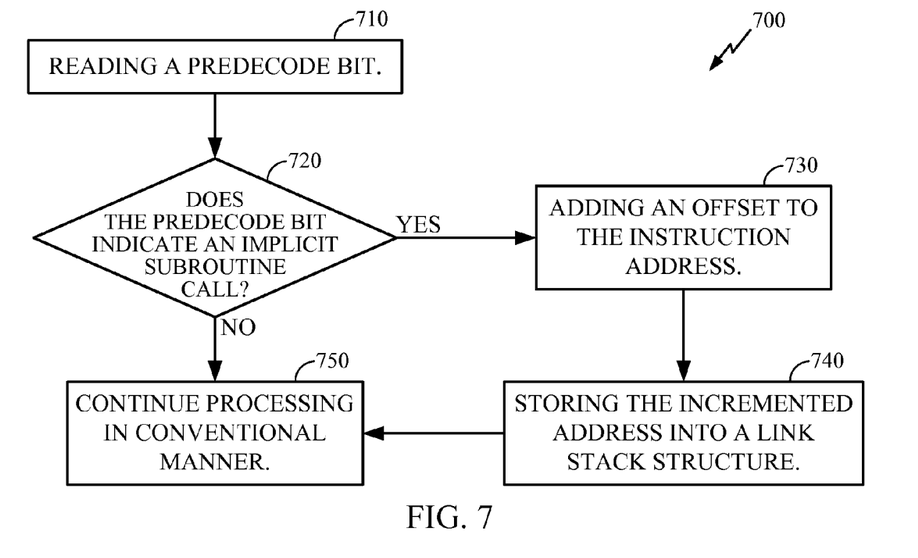
FIG. 7 is a flow chart showing further detail of blocks 610, 620, and 630 in FIG. 6.

FIG. 7 is a flow chart 700 showing further detail of blocks 610, 620, and 630 in FIG. 6. At block 710, a predecode bit associated with the instruction address is read. At block 720, flow chart 700 determines if the predecode bit indicates an implicit subroutine call. If it does, block 730 adds an offset to the instruction address. At block 740, the incremented address is stored into a link stack structure. At block 750, the pipeline process continues processing instructions in a conventional manner. If the predecode bits do not indicate an implicit subroutine call, block 720 proceeds to block 750 where the processor pipeline continues processing instructions in a conventional manner.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While the invention is disclosed in the context of embodiments, it will be recognized that a wide variety of implementations may be employed by persons of ordinary skill in the art consistent with the above discussion and the claims which follow below.

What is claimed is:

1. An apparatus comprising:
   first and second inputs configured to concurrently receive first and second instruction addresses and associated predecode information;
   a first set of adders configured to add an offset to the first and second instruction addresses to define first and second results in response to the predecode information indicating the first or second instruction address is associated with an implicit subroutine call to a subroutine; and
   means for selecting a return address from one of the first or second results.

2. The apparatus of claim 1 further comprising:
   a means for writing the return address to an explicit subroutine resource.

3. The apparatus of claim 1 further comprising:
   a flag setting logic circuit configured to track whether the first or second instruction addresses are associated with the implicit subroutine call.

4. The apparatus of claim 1 further comprising:
   a second set of adders to add a second offset to the first and second instruction addresses in response to the predecode information indicating the first or second instruction address is associated with an explicit subroutine call to a subroutine.

5. The apparatus of claim 4 wherein the offset is eight and the second constant is four.

6. The apparatus of claim 1 wherein the predecode information is encoded as a combination of bits to indicate whether the first or second instruction address is related to an implicit subroutine call to a subroutine.

7. The apparatus of claim 3 wherein the means for selecting the return address from one of the first or second results further comprises:
   select/enable logic circuit configured to enable the explicit subroutine resource for writing.

8. An apparatus comprising:
   a first input configured to receive an instruction address;
   a second input configured to receive predecode information, the predecode information describing the instruction address as being associated with an implicit subroutine call to a subroutine;
   an adder configured to add an offset to the instruction address defining a first return address in response to the predecode information;
   a third input for concurrently receiving a second instruction address with the instruction address; and
   a second adder configured to add an offset to the second instruction address defining a second return address;

logic configured to determine whether to route the first return address or the second first return address to the explicit subroutine resource.

9. The apparatus of claim 8 further comprising:
the second adder configured to add a second constant offset to the instruction address in response to an explicit subroutine call.

10. The apparatus of claim 8 wherein the explicit subroutine resource is read in response to a branch instruction indicating a return call from the subroutine.

11. The apparatus of claim 8 wherein the predecode information further describes the instruction address as the beginning of the implicit subroutine call.

12. The apparatus of claim 8 wherein the predecode information further describing the instruction address as the end of the implicit subroutine call.

13. The apparatus of claim 8 wherein the explicit subroutine resource is a link stack structure.

* * * * *